(12) United States Patent
Ellis et al.

(10) Patent No.: US 9,157,464 B2
(45) Date of Patent: Oct. 13, 2015

(54) FUNCTIONAL ELEMENT FOR THE FLUID-TIGHT ATTACHMENT TO A SHEET METAL PART, COMPONENT ASSEMBLY AND METHOD

(71) Applicant: PROFIL Verbindungstechnik GmbH & Co. KG, Friedrichsdorf (DE)

(72) Inventors: Adrian Ellis, Rayleigh Essex (GB); Richard Humpert, Bad Nauheim (DE)

(73) Assignee: PROFIL VERBINDUNGSTECHNIK GMBH & CO., KG., Friedrichsdorf (DE)

( * ) Notice: Subject to any disclaimer, the term of this patent is extended or adjusted under 35 U.S.C. 154(b) by 186 days.

(21) Appl. No.: 13/778,965

(22) Filed: Feb. 27, 2013

(65) Prior Publication Data

US 2013/0224426 A1   Aug. 29, 2013

(30) Foreign Application Priority Data

Feb. 27, 2012   (DE) .......................... 10 2012 003 819

(51) Int. Cl.
  *F16B 37/06* (2006.01)
  *F16B 19/08* (2006.01)
  (Continued)

(52) U.S. Cl.
  CPC ............ *F16B 19/086* (2013.01); *B21J 15/025* (2013.01); *B32B 3/06* (2013.01); *F16B 37/068* (2013.01); *Y10T 29/49833* (2015.01); *Y10T 428/24008* (2015.01)

(58) Field of Classification Search
  CPC .............................. F16B 37/068; F16B 37/065

USPC .................................. 411/107, 179, 181, 183
See application file for complete search history.

(56) References Cited

U.S. PATENT DOCUMENTS 4,533,288 A * 8/1985 Rivkin et al. ................. 411/176
4,802,803 A * 2/1989 Muller .......................... 411/183
(Continued)

FOREIGN PATENT DOCUMENTS

DE     196 47 831 A1   5/1998
DE     692 27 084 T2   4/1999
(Continued)

OTHER PUBLICATIONS

Extended European Search Report mailed on May 28, 2013 in corresponding European Application No. EP 13 15 6283.7.
(Continued)

*Primary Examiner* — Flemming Saether
(74) *Attorney, Agent, or Firm* — Hershkovitz & Assoc., PLLC; Abraham Hershkovitz; Eugene C. Rzucidlo (57) ABSTRACT

A functional element having a head part with a flange and a section projecting away from a first side of the flange which is punching into a sheet metal part without piercing the sheet metal part and also having a shaft part with a longitudinal axis which satisfies a function and which projects away from the side from the flange opposite to the first side. The flange and the section are arranged at least substantially coaxial to the shaft part, with the section, which is formed as a hollow cylinder having ribs extending parallel to the longitudinal direction at its outer jacket surface. At the inner side the section has a diverging truncated cone shape which substantially runs out at the free end, with the truncated cone shape serving for the dilation of the section during punching into the sheet metal part. A component assembly and a method of manufacturing it are also claimed.

16 Claims, 5 Drawing Sheets

(51) Int. Cl.
  *B21J 15/02* (2006.01)
  *B32B 3/06* (2006.01)

(56) References Cited

U.S. PATENT DOCUMENTS

| | | | |
|---|---|---|---|
| 5,020,950 A | 6/1991 | Ladouceur | |
| 5,207,588 A * | 5/1993 | Ladouceur et al. | 439/84 |
| 5,441,417 A * | 8/1995 | Ladouceur et al. | 439/84 |
| 6,108,893 A | 8/2000 | Quick, Jr. et al. | |
| 6,146,072 A | 11/2000 | Müller | |
| 6,418,609 B1 * | 7/2002 | Wojciechowski et al. | 29/432.1 |
| 6,814,531 B2 * | 11/2004 | Stevenson et al. | 411/501 |
| 6,961,986 B1 | 11/2005 | Müller | |
| 7,032,296 B2 * | 4/2006 | Zdravkovic et al. | 29/709 |
| 7,318,696 B2 | 1/2008 | Babej et al. | |
| 7,762,753 B2 * | 7/2010 | Jokisch | 411/501 |
| 2004/0068854 A1 | 4/2004 | Kato et al. | |
| 2005/0158142 A1 * | 7/2005 | Babej et al. | 411/181 |
| 2008/0145176 A1 | 6/2008 | Babej et al. | |
| 2009/0116934 A1 | 5/2009 | Trinick | |
| 2010/0088880 A1 | 4/2010 | Wang et al. | |
| 2012/0240380 A1 * | 9/2012 | Babej et al. | 29/524.1 |

FOREIGN PATENT DOCUMENTS

| | | |
|---|---|---|
| DE | 692 30 291 T2 | 6/2000 |
| DE | 199 22 864 A1 | 12/2000 |
| EP | 1 387 093 A1 | 2/2004 |
| WO | WO 2007/132194 A1 | 11/2007 |

OTHER PUBLICATIONS

German Search Report issued on Dec. 10, 2012 in German Patent Application No. 10 2012 003 819.4.
English translation of German Search Report, Dec. 2012.
English Abstract of DE 196 47 831 A1, May 1998.
English Abstract of DE 199 22 864 A1, Dec. 2000.
English Abstract of DE 692 27 084 T2, Apr. 1999.
English Abstract of DE 692 30 291 T2, Jun. 2000.

* cited by examiner

FUNCTIONAL ELEMENT FOR THE FLUID-TIGHT ATTACHMENT TO A SHEET METAL PART, COMPONENT ASSEMBLY AND METHOD

CROSS-REFERENCE TO RELATED APPLICATIONS

The present application claims priority under 35 U.S.C. 119 of German Patent Application No. 10 2012 003 819.4, filed on Feb. 27, 2012, the disclosure of which is expressly incorporated by reference herein in its entirety.

FIELD OF THE INVENTION

The present invention relates to a functional element for the fluid-tight attachment to a sheet metal part, to a component assembly consisting of the functional element and the sheet metal part and also to a method for the manufacture of such a component assembly.

SUMMARY OF THE INVENTION

The object underlying the invention is to make available a functional element and a component assembly as well as a method for manufacture of a component assembly which can be manufactured or realized at favorable cost and in particular enables a fluid-tight attachment of the head part of the functional element to a single sheet metal part and also a fluid-tight component assembly, with the shaft part and the functional element being able to be designed for carrying out a plurality of functions for which no particularly high requirements are placed on the strength of the connection to the sheet metal part, i.e. the functional element is not intended for high strength connections to the sheet metal part and should also not be used for the attachment of highly loaded, safety relevant components such as a belt reel or a belt lock of a safety belt.

In order to satisfy this object there is provided, in accordance with the present invention, a functional element having a head part with a flange and a section projecting away from a first side of the flange for punching into a sheet metal part without piercing it, and also having a shaft part with a longitudinal axis which satisfies a function and which projects away from a second side of the flange opposite to the first side, wherein the flange and the section are arranged at least substantially coaxial to the shaft part, with the section being formed as a hollow cylinder having ribs extending parallel to the longitudinal direction at its outer jacket surface and having a diverging truncated cone shape in the region of its free end face at the inner side, preferably in a region which is directly adjacent to the free end of the section, with the truncated cone shape serving for the dilation of the section during punching into the sheet metal part.

A functional element of this kind has a head part consisting of a flange and the said section, which is designed somewhat similar to or in the same way as a half hollow piercing rivet and can thus be manufactured at favorable costs but which is distinguished in several points from a half hollow piercing rivet. Piercing rivets are namely used for the connection of two sheet metal parts to one another and lead to a situation in which at least one sheet metal part is pierced. It is thus not possible to speak of a fluid-tight connection. Furthermore, piercing rivets only have the function of securing two sheet metal parts to one another whereas, in accordance with the invention, only one sheet metal part, which is not to be pierced is used in accordance with the invention. Furthermore, the element of the invention has a different function than the connection of two sheet metal parts.

The component assembly in accordance with the invention consists of the sheet metal part and the functional element and is so designed that the sheet metal part has a thickened portion in the region of the attachment in comparison to the sheet metal thickness radially outside of the attachment element, with the said section being received in the region of the thickened portion in form-fitted manner at the free end in a dilated manner without penetrating the sheet metal part, with the sheet metal material being located within the dilated section and outside of the section in engagement with the section and with the longitudinal ribs.

The method in accordance with the invention for the manufacture of a component assembly by the punching in of the functional element into the sheet metal part includes the following steps:

arrangement of the sheet metal part on a die button having a central recess, with the size of the opening of the recess determining the diameter of the thickened portion and with the die button having a central raised portion within the recess, pressing of the functional element with the free end of the section to the fore against the side of the sheet metal part remote from the die button and pressing the section into the sheet metal material, whereby the diverging truncated cone shape of the section is dilated, optionally in combination with the central raised portion of the recess of the die button, and the sheet metal material is brought into engagement with the jacket surface of the said section and also with the ribs provided there and is brought within the hollow section, displacement of the sheet metal material by the said section under the punching forces into the recess of the die button and formation of the said thickened portion and optionally of a centrally arranged indentation the thickened portion and optionally partial pressing of the side of the flange adjacent to the section, together with any features providing security against rotation there, into the side of the sheet metal part remote from the die button.

The functional element in accordance with the invention or the new attachment method is thus intended for bolts which only have to bear low loadings, such as for example a grounding bolt. The method in accordance with the invention is concerned with the attachment of a further development of a half hollow piercing rivet with a special function and with additional features providing security against rotation. The method is mainly used with the sheet metal thicknesses of above 2.5 mm. However, it can also be used with sheet metal thicknesses of less than 2.5 mm, for example, with sheet metal thicknesses of 1.5 mm or less. The sheet metal to which the bolt is fastened is not pierced so that a sealed connection is basically present. The geometry of the bolt can be so designed that the resistance to torques, press-out forces and button-out forces is relatively high. The bolt/sheet metal connection is however not able to bear the forces in the functional direction which are normally required for a bolt. Because this characteristic profile fits relatively well the requirements for a grounding bolt the specific description assumes that a grounding bolt is present for some of the drawings of the embodiments.

The functional element in accordance with the invention or the component assembly can for example be designed for the following types of functions. It can be used for the attachment of a connection terminal or a nut to secure a connection terminal. In this case a shaft part is provided with a male thread or with a thread-like formation. The forces which are to be applied are the torques which are necessary for the tightening or the functional element attached to the sheet metal part for the clamping of the terminal clamp and any normally smaller forces which can arise from the cables connected to the terminal clamp. The fluid-tight and in particular water-tight connection with the sheet metal part is of significance because it protects against corrosion in the area of the electrical connection.

Furthermore, the attachment of a brake line or of a clip for the securing of a brake line can be considered. The respective clip can for example embrace one or more brake lines and can be secured by means of a nut on the shaft part of the functional element which can here also have a thread or a thread-like shape. Instead of this the clip can be simply clipped onto the shaft part of the functional element with latching features such as one or more undercuts or a fir tree-shape. In both cases, i.e. a shaft part with a thread or with latching features, the forces which arise from the brake line tend to be low as are also the forces for the attachment of the clip to the shaft part and for the removal of the clip from the shaft part of the functional element attached to the sheet metal part. Here also corrosion is undesired and is also prevented here by the water-tight attachment of the functional element to the sheet metal part.

Furthermore, the attachment of a carpet eye to the shaft part of the functional element attached to the sheet metal part can be considered. Here again, only moderate forces are applied during installation or for the removal of carpets. Water-tightness is also required here in order to avoid moist and moldy carpets. Other examples include the attachment of holders and the attachment of a housing of a fixed vehicle component such as an electrical module or a fuse box.

In a particularly favorable form of the functional element the said hollow section comprises a cylindrical portion adjacent to the free end of the section and a portion which tapers in the direction towards the cylindrical portion and which is located between the flange and the cylindrical portion. The tapering portion brings the advantage that the support and the spreading of the cylindrical portion during the dilation is favored, whereby undesired deformations of the functional element or distortions of the sheet metal part can be avoided. Furthermore, the tapering portion facilitates the manufacture of the functional element.

The said ribs on the tapering portion have a reducing radial thickness in the direction going towards the flange, whereby the outer boundary of the ribs can, for example, extend parallel to the longitudinal axis. This design facilitates not only the manufacture of the ribs but rather also stiffens the joint between the functional element and the sheet metal part.

The inner side of the tapering portion and the inner side of the cylindrical portion of the section lie on a round cylindrical surface apart from the region of the free end which has a divergent truncated cone shape. This shape can not only be manufactured at favorable cost but rather also favors the technical values of the attachment of the functional element to the sheet metal part.

At the transition at the free end of the section from the outer side of the cylindrical portion to the region having a diverging truncated cone shape the section is sharp edged or provided with a small radius and has a radial thickness to the boundary of the divergent truncated cone shape at the free end of the cylinder section which is less than 30% of the maximum wall thickness of the cylinder section.

The flange can have recesses at the side of the said section between the ribs which receive sheet metal material to achieve an additional security against rotation. This design makes it possible to significantly increase the values for the security against rotation without driving up the manufacturing costs.

The above-described component assembly in accordance with the invention is so designed that the flange has a ring surface surrounding the shaft part which is spaced from the side of the sheet metal part adjacent to the shaft part. This component assembly is particularly suitable for use as a grounding bolt because the ring surface can be kept metallically clean by a screwed-on nut during the penetration of the hollow section of the functional element into the sheet metal part, ensuring that a low transition resistance is achieved there and can be retained over a long period of time, particularly since corrosion by liquids at the lower side of the sheet metal part, i.e. at the side of the sheet metal part remote from the functional element is not to be expected. The particular sealed attachment of the functional element in the sheet metal part, i.e. coming from the surface of the sheet metal part, also prevents corrosion there between the hollow section and the sheet metal part.

In the component assembly, the thickened portion preferably has an indentation at the center at the side remote from the functional element and radially within the dilated section. The forces which arise from a die button having a central raised portion within the ring-like recess of the die button lead to a good spreading of the said section and thus to excellent mechanical and electrical properties of the component assembly.

With the component assembly of the invention the sheet metal material is preferably in intimate engagement with the said recesses in the flange.

The punching forces for the attachment of the functional element to the sheet metal part are preferably applied to the functional element via a nut which is screwed onto the shaft of the functional element and which contacts a ring surface of the flange. The nut can thus protect the metallically blank ring surface of the functional element during and after the punching in process. In this way the sheet metal part can be painted with the attached functional element and the nut without the metallically blank ring surface being impaired by paint deposition. The nut only needs to be loosened by a few terms in order to introduce a fork-like cable eye between the nut and the metallically blank ring surface, thereafter the nut is tightened again. In this way an electric high quality connection is achieved between the cable and the sheet metal part.

The invention will be explained in more detail in the following with reference to an em 1 and with reference to the drawings in which are shown:

DETAILED DESCRIPTION OF THE INVENTION

Referring to the FIGS. 1A to 1E a functional element 10 is shown with a head part having a flange 12 and a section 16 projecting away from a first side 14 of the flange 12 and being designed for the penetration-free insertion into a sheet metal part as well as a function satisfying shaft part 20 which projects away from a side 18 from the flange opposed to the first side 14. The shaft part 20 and the functional element 10 have a longitudinal axis 22, with the flange 12 and the section 16 being arranged at least substantially coaxial to the shaft part 20. The section 16 is designed as a hollow cylinder which has ribs 26 at its outer jacket surface 24 extending parallel to the longitudinal direction. In the region of its free end face 28 the hollow section 16 has, at the inner side 30, a region 32 of a divergent truncated cone shape 34 directly adjacent to the free end 28 of the hollow section which runs out at least substantially at the free end. During the insertion into the sheet metal part this truncated cone shape 34 serves for the dilation of the hollow section 16.

Figure 1A:
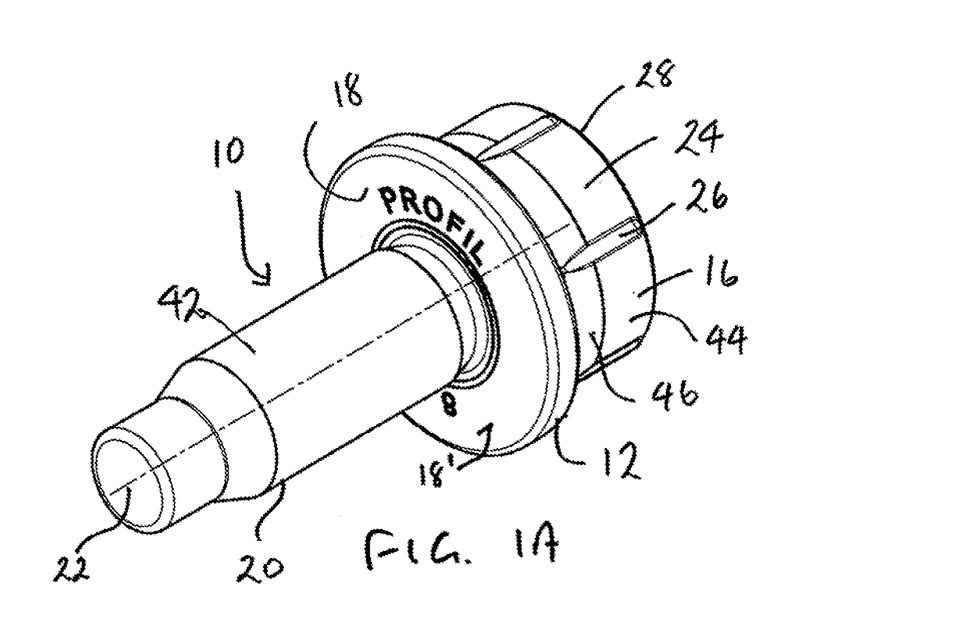
FIGS. 1A-1E a representation of a functional element in accordance with the invention and indeed in two perspective views (FIGS. 1A and 1B), in an end view (FIG. 1C) in the arrow direction C of FIG. 1B, in a side view (FIG. 1D) and in a view partly sectioned in the longitudinal direction (FIG. 1E), FIGS. 2A-2E representations corresponding to the representations of FIGS. 1A-1E but with a nut screwed onto the shaft part of the functional element and FIGS. 3A and 3B two drawings to illustrate the attachment in accordance with the invention of the functional element of the invention to a sheet metal part, with FIG. 3B showing the component assembly in accordance with the invention in a half section.
Figure 1B:
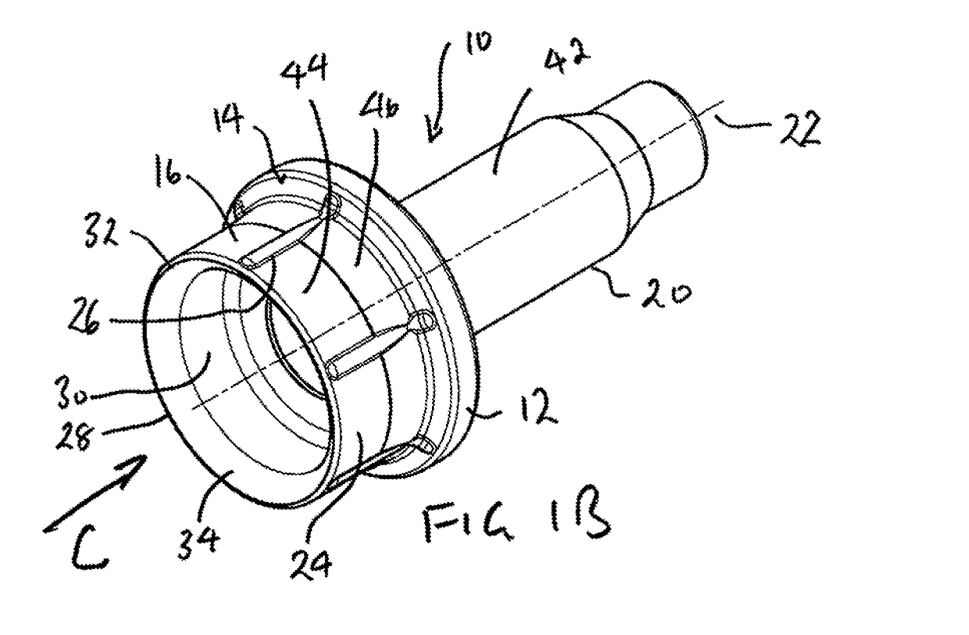
Figure 1C:
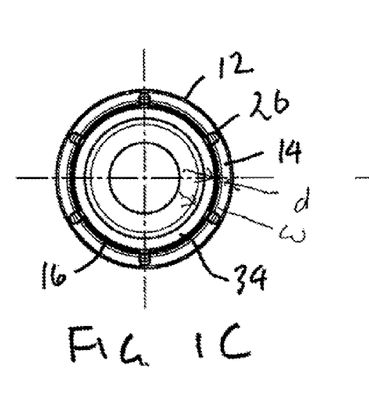
Figure 1D:
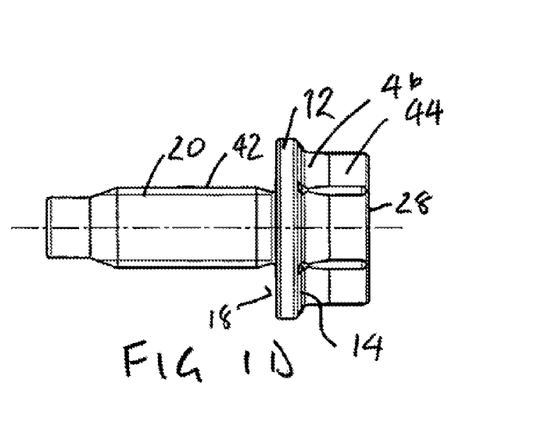
Figure 1E:
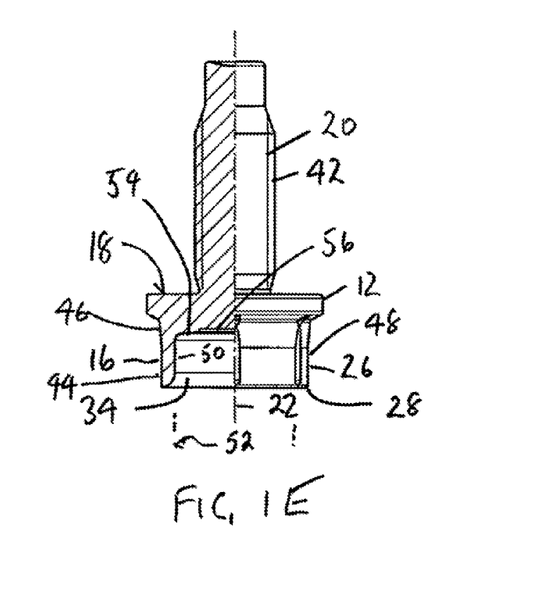

At this point it should be emphasized that the region 32 does not necessary have to have a shape corresponding strictly to that of a truncated cone, but rather can also have an arched surface, a trumpet-like shape or a different shape. It is very important that the region 32 has an progressively diverging shape in a direction going from the flange 12 to the free end 28.

In this example the functional element 10 is designed for the attachment of a nut 40 (FIGS. 2A-2E) for the securing of a terminal clamp (not shown) and has for this purpose a thread cylinder 42. This design is however not essential. Instead of this, the shaft part 20 can for example be designed for carrying out one of the following functions:

The attachment of a brake line or of a clip for the attachment of a brake line, the attachment of a carpet eye, the attachment of a holder, the attachment of a housing of a fixed vehicle component in which no particular demands are placed on the strength of the connection, i.e. not for the attachment of safety-relevant components.

As is evident from the Figures, the said hollow section 16 consists of a cylindrical portion 44 adjacent to the free end 28 of the section and a part 46 which tapers in the direction towards the cylindrical portion 44 and which is arranged between the flange 12 and the cylindrical portion 44, with the said ribs 26 having a reducing radial thickness in the direction going towards the flange at the tapering portion, whereby the external boundary 48 of the ribs 26 extends, for example, parallel to the longitudinal axis 22. The inner side 50 of the tapered portion 46 and of the cylindrical portion 44 of the hollow section 16 lie on a round cylindrical surface 52 apart from the region 32 at the free end 28 which has a divergent truncated cone shape 34. The inner side 50 merges, adjacent to the side 14 of the flange 12 via a rounded portion into a base region 54 which preferably has a central indentation 56. This indentation 56 which is circular in plan view is favorable from a technical manufacturing point of view and serves as a buffer space during the insertion into the sheet metal part.

The hollow section 16 is sharp-edged or provided with a small radius at the free end 28 at the transition from the outer side of the cylindrical portion 44 to the region 32 having a divergent conical cone shape 44 and has a radial thickness "d" for the bounding of the divergent truncated cone shape 34 at the free end of the cylinder section 44 which is normally but not necessarily less than 30% of the maximum wall thickness "w" of the cylindrical section 44 (i.e. without including the radial thickness of the ribs 26).

Figure 2A:
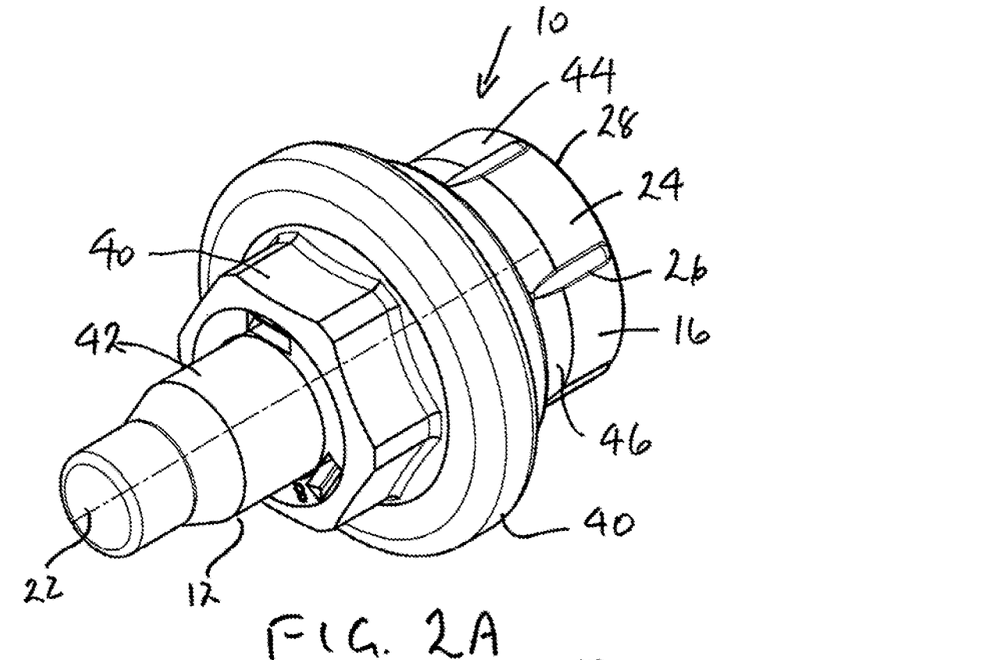
Figure 2B:
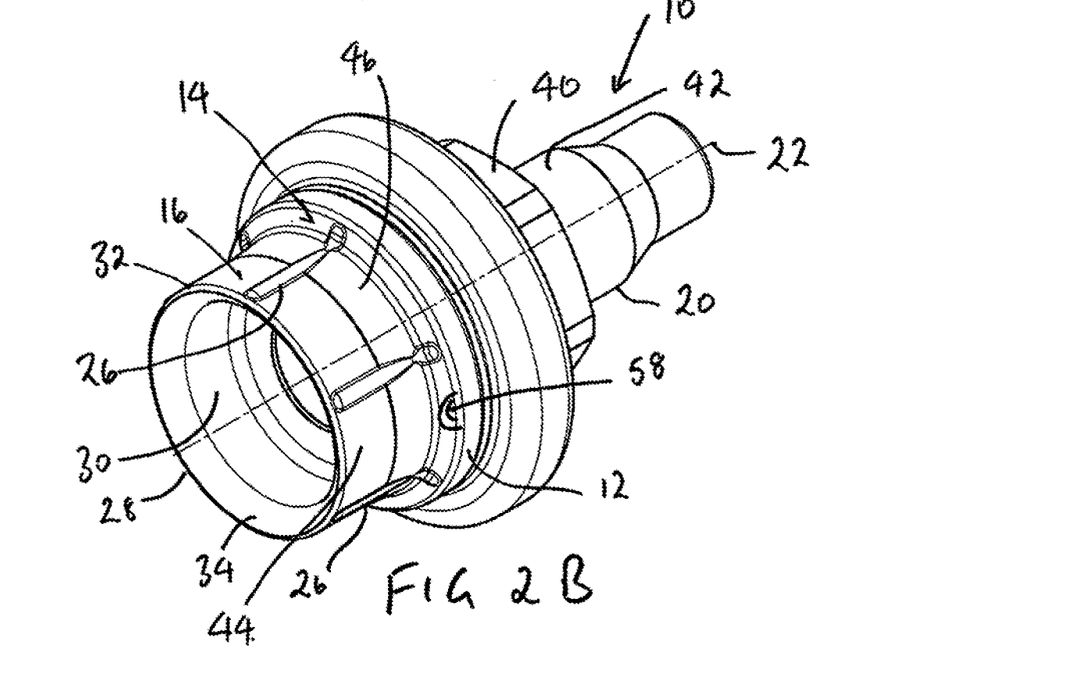
Figure 2C:
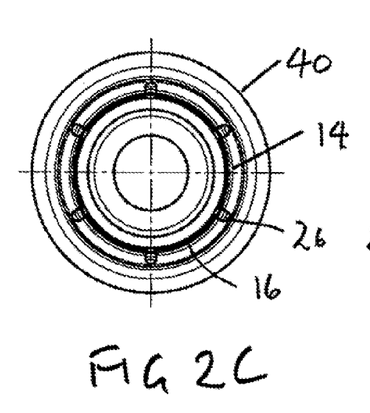
Figure 2D:
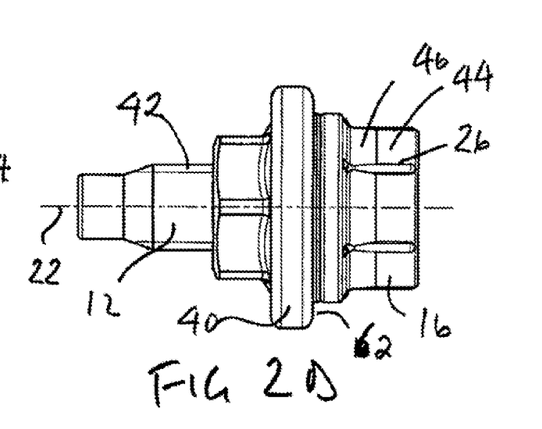
Figure 2E:
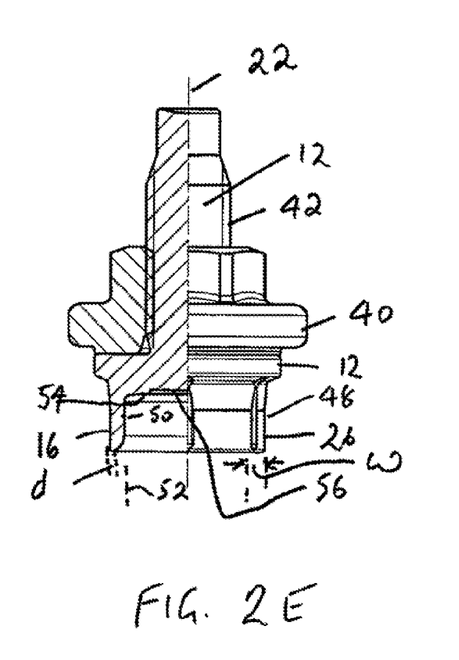
Figure 3A:
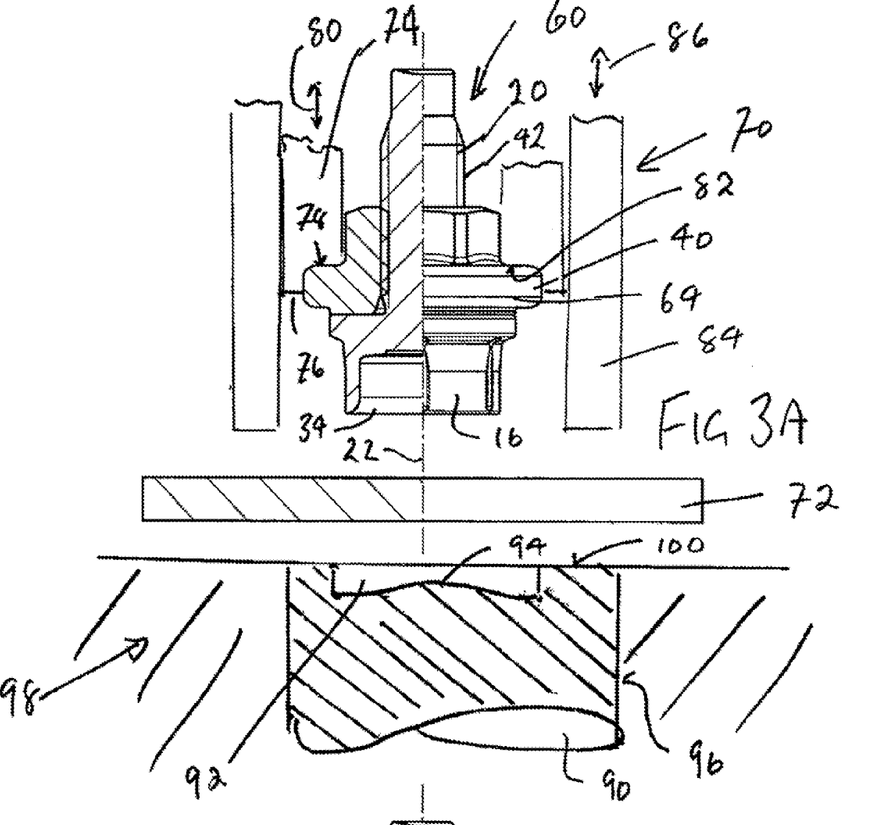
Figure 3B:
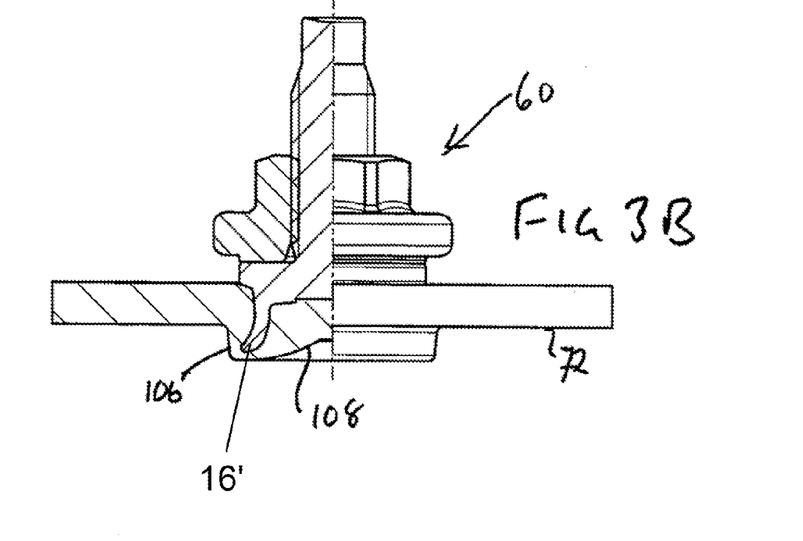

Furthermore, the flange 22 can have recesses 58 at the side 14 of the said hollow section 12 in the ribs 26 (only one recess is shown in FIG. 2B by way of example) which, in the finished component assembly 60 in accordance with FIG. 3B, can accommodate the sheet metal material for the obtainment of additional security against rotation.

In these examples, which are shown in the drawings, the shaft part 20 is—as already explained—provided with a thread 42 for the screwing on of a nut 40. The side 62 of the nut 40 confronting the flange 22 is designed as a flange nut with a flange 64, stands however in principle perpendicular to the central longitudinal axis 22 of the functional element and seals against the metallically blank ring-shaped contact surface of the flange 12 which surrounds the shaft part. It can however be favorable to form the contact surface 62 of the nut which faces the flange 12 or the ring surface 18' of the flange (which is formed at the side 18 of the flange) as a shallow conical surface, i.e. with an included cone angle of just less than 180°, so that a tight seal arises radially outwardly at the ring surface 18'. Instead of this the ring surface 18' could be provided with such a conical angle.

The preferred method for the manufacture of the component assembly 60 by insertion of the functional element 10 will now be described and indeed with reference to the FIGS. 3A and 3B. The FIG. 3A shows the functional element 10 having a screwed on flange nut 10 in accordance with FIGS. 2A to 2E in a setting head or in a punching head 70 above a non-pierced sheet metal part 72. Such setting heads or punching heads 70 are extremely well known in the field of functional elements. They have in general a hollow plunger 74 which is designed at its lower end 76 with a mount 74 for receiving a functional element. The plunger 74 is movably arranged in accordance with the double arrow 80 in the punching head 70 and can be moved into an upper position in which a functional element 10, here with a screwed on nut 40 can be brought through a guide channel (not shown) beneath the plunger 72. The plunger 72 is subsequently moved downwardly until the hexagonal region of the nut 40 above the flange is located within the hollow plunger and the surface of the mount 74 of the plunger 72 facing the upper side 82 of the flange 64 of the flange nut 40 contacts this surface 82. Around the plunger 74 there is a cylindrical hold-down member 84 which is movably journalled in accordance with the arrow 86 and which is likewise only schematically shown.

Beneath the sheet metal part 72 there is a die button 90 having a central recess 92 and at the center of this recess 92 a central upwardly rounded raised portion 94. Both the recess 92 and also the raised portion 94 are of circular shape in plan view and are rotationally symmetrically arranged relative to the central longitudinal axis 22 of the functional element. The die button is located in the corresponding opening 96 of a lower tool 98, with the ring-shaped sheet metal contact surface 100 lying flush area-wise with the upper side 102 of the lower tool 98.

In many cases the setting head 70 is attached to an upper tool of a press (not shown) or to an intermediate tool of a press, whereas the lower tool 98 represents the lower tool of the press. For each stroke of the press a functional element 10, is in each case punched into the sheet metal part by means of the punching head 70 and the die button 90, in this example a functional element 10 with a screwed on nut 40. Should the nut 40 not be used for the punching in of the functional element the plunger 74 presses directly against the ring surface 18' of the functional element.

During the closing of the press the spring-biased hold-down member 84 pressed towards the sheet metal part onto its lower end face 104 clamps the sheet metal part 72 between itself and the ring surface 100 of the die button. During the further closing of the press the plunger 76 presses the functional element 10 with the nut downwardly until the free end of the hollow section 16 contacts the upper side of the sheet metal part 72 and starts to displace the sheet metal material beneath the hollow section 16. With progressive downwardly directed movement of the punching head 70 the sheet metal material is pressed into the mount of the die button 90 and forms the thickened portion of the sheet metal part which is designated by 100 in FIG. 3B. During this movement the contact of the truncated cone shape 34 of the hollow section and also the pressure which originates from the raised portion 94 leads to a downwardly diverging shape 16' of the hollow section 16 of the functional element 10. In this connection sheet metal material is introduced into the hollow cavity of the hollow section and presses against the inner side 50 of the hollow section 16, whereby the hollow section 16' is stiffened from the inside. It is evident from FIG. 3B that the end face 28 of the hollow section 16' does not project through the underside of the sheet metal part, i.e. does not penetrate it, whereby a fluid-tight attachment of the functional element 10 to the sheet metal part has taken place. In this connection the longitudinal ribs engage into the sheet metal material and thus generate the security against rotation. If recesses such 58 are provided the sheet metal material is pressed into these recesses 58 and increases the value of the security against rotation accordingly. Since the hollow section 16' has a spread apart form, the functional element is secured against pull-out forces which attempt to pull the functional element out of the sheet metal part 72. As the flange 12 lies in full area contact with the sheet metal part 72 and preferably has been—pressed into the later a good button-out resistance is also achieved. The thickened portion 106 also provides space for the accommodation of the hollow section 16'.

The thickening 106 has an indentation 108 at the center at the side opposite to the functional element 10 and radially within the dilated section 16'. The indentation has a shape complementary to the raised portion 94 of the die button 90.

Although the method was described here in the sense of the orientation of the functional element 10 in FIGS. 3A and 3B this orientation is in no way essential. By way of example the punching head 70 could be arranged pointing upwardly in the lower tool of the press or likewise pointing upwardly in the intermediate plate of the press and the die button is then arranged pointing downwardly in the intermediate plate of the press or in the upper tool of the press. The designations "up" and "down" or similar designations are accordingly to be understood with reference to the geometrical arrangement of FIGS. 3A and 3B and should not be interpreted restrictively. In other respects inclined positions of the punching head 70 and the die button 90 are also possible.

It is also not compulsory to effect the attachment of the functional element in a press. This can also take place—without restriction—by means of a robot which presses the functional element towards a sheet metal part supported on a die button or by means of a pair of tongs or a C-frame. Installations known per se for the automatic attachment of half hollow piercing rivets can also be considered for the attachment of the functional elements in accordance with the invention.

The method described here thus includes the following steps:

arrangement of the sheet metal part 72 on a die button 90 having a central recess 92, with the size of the opening of the recess 92 determining the diameter of a thickened portion 106 and the depth of the recess 92 determining the height of the thickened portion 106, with the die button having a central raised portion 94 within the recess, pressing the functional element 10 with the free end 28 of the hollow section 16 to the fore towards the side of the sheet metal part 72 remote from the die button 90 and pressing of the hollow section 16 into the sheet metal material, whereby the divergent cone-shape 34 of the section is dilated, optionally in combination with a central raised portion 94 of the recess 92 of the die button 90, and the sheet metal material is brought into engagement with the jacket surface of the section 16 and also with the ribs 26 provided there and within the hollow section 16, displacement of the sheet metal material by the said section 16 under the punching forces into the recess 92 of the die button 90 and formation of the said thickened portion 106 and optionally of the named indentation 108, and optionally partial pressing of the side 14 of the flange 12 adjacent to the section, together with any features 58 providing security against rotation that are present there, into the side of the sheet metal part 72 remote from the die button 90.

In this connection the punching in forces are applied to the functional element 10 preferably via a nut 40 which is screwed onto the shaft part 20 of the functional element 10 and contacts a ring surface 18' of the flange 12.

The flange nut 40 can, as is explained in more detail above, be used for the punching in of the functional element.

The result of the method is the component assembly 60 which is shown in FIG. 3B consisting of the sheet metal part 72 and the functional element 10 attached thereto. It is particularly important that the sheet metal part 72 has a thickened portion 106 in the region of the attached functional element 10 in comparison to the sheet metal thickness radially outside of the attached functional element. The hollow section 16 is dilated in the region of the thickened portion 106 and at the free end and is received in form-fitted manner in the sheet metal part 72 without penetrating the sheet metal part. Sheet metal material is located within this dilated section and outside of the section in engagement with the section 16' and with the longitudinal ribs 26.

The ring surface 18' of the flange 12 which surrounds the shaft part 20 is located at a distance in front of the side of the sheet metal part 72 confronting the shaft part.

The functional element can consist of the same material which is normally used for half hollow piercing rivets or of material which is used for the manufacture of screws by means of cold deformation of the quality class 4.6 or 8.8 (or higher) in accordance with DIN.

The invention claimed is:

1. A functional element (10) having a head part with a flange having first and second sides (14, 18) and a hollow section (16) projecting away from the first side (14) of the flange (12) for piercing-free insertion into a sheet metal part (72) and also having a shaft part (20) with a longitudinal axis (22) which satisfies a function and which projects away from the second side (18) of the flange (12) opposite to the first side (14), wherein the flange (12) and the section (16) are arranged at least substantially coaxial to the shaft part (20), the section (16), being formed as a hollow cylinder having an inner side, a free end face (28), an outer jacket surface and ribs (26) extending parallel to the longitudinal direction at its outer jacket surface and the section (16) further having a diverging truncated cone shape (34) in the region (32) of its free end face (28) at the inner side, wherein the said hollow section (16) includes a cylindrical portion (44) adjacent to the free end (28) of the hollow section (16) and a portion (46) which tapers in the direction towards the cylindrical portion (44) and which is arranged between the flange (12) and the cylindrical portion (44), wherein the said ribs (26) have a reducing radial thickness at the tapering portion (46) in the direction towards the flange (12).

2. The functional element in accordance with claim 1, the truncated cone shape being in a region (32) which is directly adjacent to the free end (28) of the section.

3. The functional element in accordance with claim 1, wherein the shaft part (20) is designed to carry out one of the following functions:
   the attachment of a connection terminal or of a nut for the attachment of a connection terminal, the attachment of a brake line or a clip for the attachment of a brake line,
   the attachment of a carpet eye,
   the attachment of a holder,
   the attachment of a housing of a fixed vehicle component for which no special requirements are placed on the strength of the connection.

4. The functional element in accordance with claim 1, wherein the ribs (26) have an outer boundary (48) which extends parallel to the longitudinal axis (22).

5. The functional element in accordance with claim 1, wherein an inner side (50) of the tapered portion (46) and of the cylindrical portion (44) of the hollow section (16) lie on a round cylindrical surface (52) apart from the region (32) at the free end (28) which has a divergent truncated cone shape (34).

6. The functional element in accordance with claim 1, wherein the section (16) is provided at the free end with a sharp edge or with a small radius at the transition from an outer side of the cylindrical portion (44) to the region having a diverging truncated cone shape (34) and has a radial thickness (d) to the boundary of the diverging truncated cone shape (34) at the free end of the section (16) which amounts to less than 30% of the maximum wall thickness (w) of the cylinder portion (44).

7. The functional element in accordance with claim 1, wherein the flange (12) has recesses (58) at the side (14) of the section (16) between the ribs (26) which receive sheet metal material for the obtainment of an addition security against rotation.

8. The functional element in accordance with claim 1, wherein a nut (40) is screwed into the shaft part (20), the flange has a metallically blank ring surface (18') which surrounds the shaft part (20) and the nut seals off the metallically blank ring surface (18').

9. A component assembly including a sheet metal part and a functional element (10) having a head part with a flange having first and second sides (14, 18) and a hollow section (16) projecting away from the first side (14) of the flange (12) for piercing-free insertion into a sheet metal part (72) and also having a shaft part (20) with a longitudinal axis (22) which satisfies a function and which projects away from the second side (18) of the flange (12) opposite to the first side (14), wherein the flange (12) and the section (16) are arranged at least substantially coaxial to the shaft part (20), the section (16), being formed as a hollow cylinder having an inner side, a free end face (28), an outer jacket surface and ribs (26) extending parallel to the longitudinal direction at its outer jacket surface and the section (16) further having a diverging truncated cone shape (34) in the region (32) of its free end face (28) at the inner side, with the truncated cone shape serving for the dilation of the section (16) during punching into the sheet metal part, wherein the said hollow section (16) includes a cylindrical portion (44) adjacent to the free end (28) of the hollow section (16) and a portion (46) which tapers in the direction towards the cylindrical portion (44) and which is arranged between the flange (12) and the cylindrical portion (44) wherein the said ribs (26) have a reducing radial thickness at the tapering portion (46) in the direction towards the flange (12), wherein the sheet metal part (72) has a thickened portion (106) in the region of the attachment (10) in comparison to the sheet metal thickness radially outside of the attached functional element (10), wherein the said section (16') is received in dilated form at the free end in the region of the thickened portion (106) in form-fitted manner without penetrating the sheet metal part (72), and with sheet metal material being located within the dilated section and being in engagement with the section (16') and with the longitudinal ribs (26).

10. The component assembly in accordance with claim 9, wherein the flange (12) has a ring surface (18') surrounding the shaft part (20) which stands at a spacing from the side of the sheet metal part (72) facing the shaft part (20).

11. The component assembly in accordance with claim 9, wherein the thickened portion (106) has an indentation (108) at the center at the side remote from the functional element (10) and radially within the dilated section.

12. The component assembly in accordance with claim 9, wherein the functional element has recesses (58) in the flange (12) and sheet metal material is located in engagement with the said recesses (58).

13. A method for the manufacture of the component assembly (60) in accordance with claim 9 by punching of the functional element (10) into the sheet metal part (72), the method having the following steps:
   arrangement of the sheet metal part (72) on a die button (90) having a central recess (92), with the size of the opening of the recess (92) determining the diameter of the thickened portion (106) and with the die button having a central raised portion (108) within the recess,
   pressing of the functional element (10) with the free end (28) of the section (16) to the fore against the side of the sheet metal part (72) remote from the die button and pressing the section (16) into the sheet metal material, whereby the diverging truncated cone shape (34) of the section is dilated and the sheet metal material is brought into engagement with the jacket surface of the said section (16) and also with the ribs (26) provided there and is brought within the hollow section (16'),
   displacement of the sheet metal material by the said section (16) under the punching forces into the recess (92) of the die button (90) and formation of the said thickened portion (106).

14. A method in accordance with claim 13, wherein the formation of the said thickened portion (106) also results in the formation of an indentation (108) in the thickened portion by a central raised portion (108) of the recess (92) of the die button (90) which contributes to the dilation of the section (16).

15. A method in accordance with claim 14 including the further step of partial pressing of the first side (14) of the flange adjacent to the section, together with any features (58) providing security against rotation there, into a side of the sheet metal part (72) remote from the die button.

16. A method in accordance with claim 13, wherein the punching forces are applied to the functional element (10) via a nut (40) which is screwed onto the shaft part of the functional element and contacts a ring surface (18') of the flange.

* * * * *